Jan. 25, 1949.  C. K. WILKINSON  2,459,860
ENGINE NOISE EQUIPMENT
Filed Dec. 2, 1944
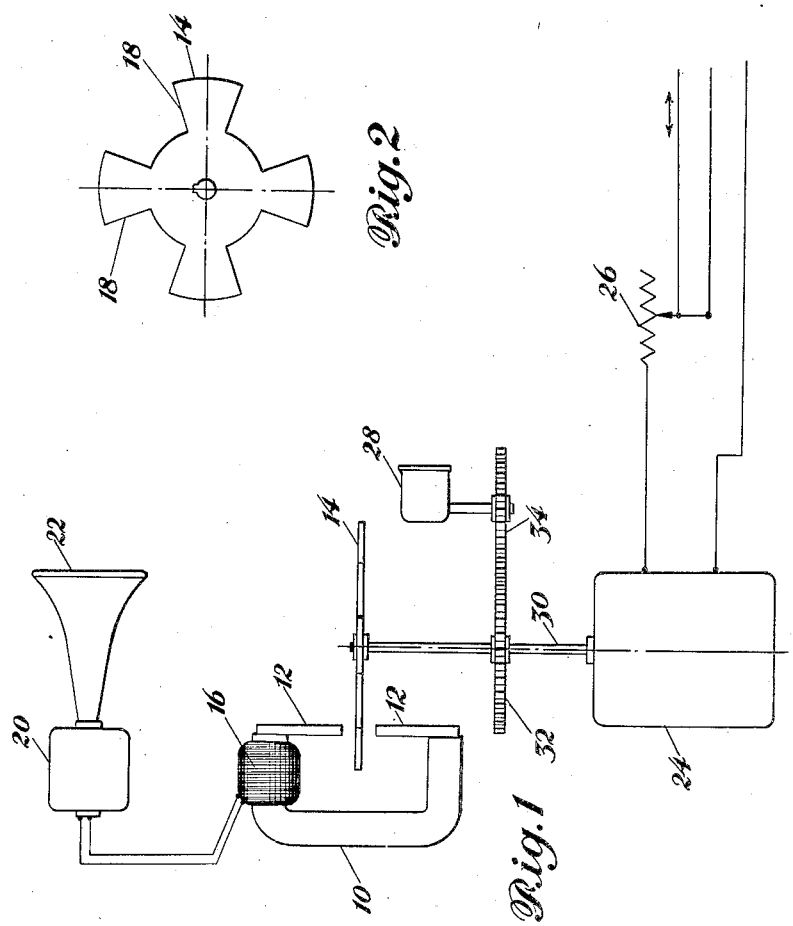
Inventor
C. K. Wilkinson,
By J. E. Bush
Attorney Patented Jan. 25, 1949

2,459,860

UNITED STATES PATENT OFFICE 2,459,860

ENGINE NOISE EQUIPMENT

Claude K. Wilkinson, United States Navy

Application December 2, 1944, Serial No. 566,383

1 Claim. (Cl. 177—7)

(Granted under the act of March 3, 1883, as amended April 30, 1928; 370 O. G. 757)

This invention relates to a noise maker and has for an object to provide an improved noise maker especially adapted for simulating the noise made by an engine or motor in operation, particularly that produced by an aircraft motor and propeller.

In operating aircraft, varying amounts of noise are produced by the engine and propeller. Such noise is an inescapable part of the environment of the aircraft crew and hence in training a crew for operating aircraft on some types of training equipment on the ground, it is desirable that the crew be exposed to the noise similar to that which it would be exposed to in actual aircraft operation so as to get training and practice in operating the aircraft under simulated operating conditions. In the well-known Link trainer the trainee is intended to receive his training under conditions simplating actual flight as closely as possible. Engine noise is one of the inescapable flight conditions. With this inventon it becomes possible for the trainee to undergo his training under conditions more closely simulating actual flying conditions than otherwise possible.

The volume of noise produced by different aircraft will necessarily be different, depending on whether it is a single motor or multi-motor aircraft and depending on the amount that the crew is exposed to or protected from the motor noise. It is an object of this invention to provide an engine noise simulator whose volume can be correspondingly controlled.

A further object of this invention is to provide a noise maker capable of producing sounds of other types.

With the foregoing and other objects in view, the invention consists in the construction, combination and arrangement of parts hereinafter set forth, claimed and illustrated in the drawing in which:

Fig. 1 is a schematic elevational view of the noise maker of this invention, and Fig. 2 is an elevational view of the interrupter disc.

A magnet 10, shown as a permanent magnet by way of example, is provided with pole pieces 12 which are spaced from one another sufficiently to receive a disc 14 between them. The magnet is provided with a coil or winding 16 in which currents are induced upon rotation of the disc 14 when projections 18 of the disc 14 present themselves between the poles, thus acting as a flux interrupter and inducing a pulsating current in the coil 16. The output from the winding 16 is connected to an amplifier 20 which will in turn supply a loud speaker 22.

The disc 14 may be rotated by a motor 24 whose speed is rendered adjustable by a rheostat 26, the settings of which may be controlled in any suitable manner. In the case of the simulation of engine noise, the rheostat 26 may be adjusted in proportion to movements of the engine throttle. Where it is desired to obtain a visual indication of simulated speed of an aircraft engine, a tachometer 28 may be connected to the shaft 30 of the motor 24 through suitable gearing 32 and 34. The output of this device can be varied to simulate any desired sound effects by changing the pattern of the projections 18 or by changing the adjustment of the pole pieces 12.

The essential parts of the present equipment may be said to consist of the magnet 10, its winding 16, a phone or speaker 22, a disc 14 having a peripheral pattern and means for driving the disc.

Other modifications and changes in the number and arrangement of the parts may be made by those skilled in the art without departing from the nature of this invention, within the scope of what is hereinafter claimed.

The invention herein described and claimed may be manufactured and used by or for the Government of the United States of America for governmental purposes without the payment of any royalties thereon or therefor.

What is claimed is:

An aircraft engine noise and speed simulator comprising a magnet having its pole members slightly spaced apart, a rotatable disc positioned adjacent said pole members and having a plurality of projections rotatable therebetween through the magnetic flux to provide a flux interrupter, a winding about said magnet adapted to have current induced therein by the interruptions of flux, a speaker connected to said winding, a motor for rotating said disc, means for adjustably controlling the speed of said motor, a tachometer designed to indicate simulated speeds of the engine, and transmission mechanism connected between said motor and said tachometer and designed to cause the latter to indicate simulated speeds of the aircraft engine.

CLAUDE K. WILKINSON.

REFERENCES CITED

The following references are of record in the file of this patent:

UNITED STATES PATENTS

| Number    | Name        | Date          |
|-----------|-------------|---------------|
| 1,401,883 | Crabb       | Dec. 27, 1921 |
| 1,470,093 | Modigliani  | Oct. 9, 1923  |
| 1,665,331 | Thomson     | April 10, 1928|
| 1,978,583 | Kentner     | Oct. 30, 1934 |
| 2,110,144 | Durkee et al.| Mar. 8, 1938 |
| 2,354,699 | Owens       | Aug. 1, 1944  |